United States Patent
Wu et al.

(10) Patent No.: US 6,896,305 B1
(45) Date of Patent: May 24, 2005

(54) HIGH-LOAD CAPABILITY NON-EXPLOSIVE CABLE RELEASE MECHANISM

(75) Inventors: Jui-Yu Wu, Irvine, CA (US); Patrick Laughlin, Thousand Oaks, CA (US)

(73) Assignee: G&H Technology, Inc., Camarillo, CA (US)

( * ) Notice: Subject to any disclaimer, the term of this patent is extended or adjusted under 35 U.S.C. 154(b) by 193 days.

(21) Appl. No.: 10/358,474

(22) Filed: Feb. 4, 2003

(51) Int. Cl.[7] ................................................. B66C 1/28
(52) U.S. Cl. ............................. 294/82.24; 294/82.35; 294/905
(58) Field of Search ....................... 294/82.24, 82.25, 294/82.26, 82.27, 82.3, 82.32, 82.35, 82.36, 294/905; 102/377, 378

(56) References Cited

U.S. PATENT DOCUMENTS

| | | | |
|---|---|---|---|
| 2,489,984 A | | 11/1949 | Shoemaker |
| 2,685,924 A | * | 8/1954 | Van Haaften ................. 74/3.52 |
| 3,012,811 A | | 12/1961 | Sandrock |
| 3,813,090 A | | 5/1974 | Merola |
| 4,054,265 A | | 10/1977 | Magg |
| 4,275,786 A | | 6/1981 | Lee |
| 4,540,210 A | | 9/1985 | Smith |
| 4,682,804 A | | 7/1987 | Palmer |
| 4,826,229 A | | 5/1989 | Smith |
| 5,221,171 A | | 6/1993 | Rudoy |
| 5,273,333 A | * | 12/1993 | Hatfield et al. ............ 294/82.3 |
| 5,312,147 A | | 5/1994 | Rudoy |
| 6,269,748 B1 | | 8/2001 | Rudoy et al. |
| 6,390,722 B1 | | 5/2002 | Godfrey |

OTHER PUBLICATIONS

European Application 11-23 G&H Technology.
Japanese Appln. Nov. 22, 2000 G&H Technology.

* cited by examiner

*Primary Examiner*—Dean J. Kramer
(74) *Attorney, Agent, or Firm*—Thomas I. Rozsa; Tony D. Chen

(57) ABSTRACT

A high-load capability non-explosive cable release mechanism for retaining the adjacent ends of two cables and releasing them upon receiving a signal from a remote source. The cable release mechanism has a casing for housing two non-explosive actuators (NEAs), which also has a center bore for housing a jaw and ramp assembly. Each NEA is connected to the jaw and ramp assembly for independently operating the jaw and ramp assembly to retain or release the proximal ends of the two cables. Upon receiving the signal by any one or both of the NEAs, the jaw and ramp assembly will release the adjacent ends of the two cables from the casing.

19 Claims, 3 Drawing Sheets

HIGH-LOAD CAPABILITY NON-EXPLOSIVE CABLE RELEASE MECHANISM

BACKGROUND OF THE INVENTION

1. Field of the Invention

The present invention generally relates to the field of mechanical structural separation devices used in aerospace, manufacturing and construction industries, and more particularly relates to the structure and designs of non-explosive cable release mechanisms.

2. Description of the Prior Art

Cable release mechanism are often utilized in aerospace, manufacturing and construction industries. One example of utilizing such mechanisms is to provide a quick and reliable release of the joined ends of two cables for component deployment of spacecraft. Preferably, the release mechanism is designed to be used in a repeatable manner.

The following (15) prior art patents are found to be pertinent to the field of the present invention:

1. U.S. Pat. No. 2,489,984 issued to Shoemaker on Nov. 29, 1949 for "Explosive-Release Mechanism" (hereafter the "Shoemaker Patent");
2. U.S. Pat. No. 3,012,811 issued to Sandrock on Dec. 12, 1961 for "Gripping-Tool" (hereafter the "Sandrock Patent");
3. U.S. Pat. No. 3,813,090 issued to Merola on May 28, 1974 for "Clamp" (hereafter the "Merola Patent");
4. U.S. Pat. No. 4,054,265 issued to Magg on Oct. 18, 1977 for "Device For Gripping Ropes, Cables Or Wires" (hereafter the "Magg Patent");
5. U.S. Pat. No. 4,275,786 issued to Lee on Jun. 30, 1981 for "Apparatus For Selectively Coupling Cables To Well Tools" (hereafter the "Lee Patent");
6. U.S. Pat. No. 4,540,210 issued to Smith on Sep. 10, 1985 for "Cable Release Mechanism" (hereafter the "'210 Smith Patent");
7. U.S. Pat. No. 4,682,804 issued to Palmer on Jul. 28, 1987 for "Releasable Coupling Assembly" (hereafter the "Palmer Patent");
8. U.S. Pat. No. 4,826,229 issued to Smith on May 2, 1989 for "Cable Release Mechanism" (hereafter the "'229 Smith Patent");
9. U.S. Pat. No. 5,221,171 issued to Rudoy on Jun. 22, 1993 for "Non-Explosive Separation Nut" (hereafter the "'171 Rudoy Patent");
10. U.S. Pat. No. 5,312,147 issued to Rudoy on May 17, 1994 for "Electrotechnical High Load Separation Apparatus With A Smooth Release" (hereafter the "'147 Rudoy Patent");
11. U.S. Pat. No. 6,269,748 B1 issued to Rudoy on Aug. 7, 2001 for "Release Mechanism" (hereafter the "'748 Rudoy Patent");
12. U.S. Pat. No. 6,390,722 B1 issued to Godfrey on May 21, 2002 for "Release Link For Interconnected Cables" (hereafter the "Godfrey Patent");
13. European Patent Application of G&H Technology, Inc. filed on Nov. 23, 2000 (hereafter the "G&H's European Application");
14. Japanese Patent Application of G&H Technology, Inc. filed on Nov. 22, 2000 (hereafter the "G&H's Japanese Application").

The Shoemaker Patent disclosed an explosive release mechanism for detachably securing a bomb to an aircraft and for releasing the bomb from the aircraft.

The Sandrock Patent disclosed a releasable gripping tool which is self-grasping and remotely actuatable for disengaging a load.

The Merola Patent disclosed a clamp which provides a secure grip upon a work-piece. The clamp has a frame and a pair of spaced plate members which form confronting, converging roller surfaces. The clamp also has friction rollers associated with the roller surface and resiliently secured thereto so that the distance between the rollers may be enlarged to engage the object to be clamped, but will securely hold the object against removal from the grip of the rollers if forces are extended in the direction of convergence of the roller surfaces.

The Magg Patent disclosed a winch for use on sailing yachts as a sheet or anchor winch, and in which the rope or the like to be gripped is guided over a driven member comprising two conical discs operatively coupled to each other and opening around the entire periphery of the driven member. It has a drive shaft which is operable to rotate the discs, and at least one conical disc and preferably both conical discs, are mounted for rotation about respective axes fixedly inclined relative to the axis of the drive shaft. The discs conjointly define, along a part of their circumferences, a wedge-shape opening for the rope to be gripped or clamped. The discs are rotatably supported on respective mounting plates which are secured to each other and to a suitable support surface, such as the deck of a yacht.

The Lee Patent disclosed an apparatus for selectively coupling suspension cables to well tools. It includes a collapsible assembly of two or more retaining members arranged within an enclosed chamber and operatively positioned for normally retaining upper and lower tool-support members in a position where they are tandemly coupled or interconnected.

The '210 Smith Patent disclosed a cable release mechanism for mounting on the deck of a towboat, tug and other applications and receiving one end of a tow cable to secure and selectively release a barge or system of barges. It includes a pelican hook pivotally mounted on a base which is secured to the deck of the towboat in closed, towing configuration by means of a keeper ring normally engaging and securing the pelican hook. Release of the tow cable from the pelican hook is automatically achieved by activating an air or hydraulic cylinder having a piston in cooperation with the keeper ring, to extend the cylinder piston and force the keeper ring from engagement with the pelican hook, allowing the pelican hook to pivot engagement with the pelican hook, allowing the pelican hook to pivot rearwardly responsive to the load on the tow cable.

The Palmer Patent disclosed a releasable coupling assembly for secure retention and controlled reliable release of a releasable structure with respect to a base structure, such as a releasable spacecraft with respect to a mother spacecraft or launch vehicle. The releasable coupling assembly includes a latch housing on the base structure and supporting a pair of pivotal latches for locking engagement with oppositely projecting locking tabs of a pawl rotatably supported on a locking shaft mounted on the releasable structure. The two latches are respectively coupled to a pair of control pistons movably disposed within cylinders in the latching housing and biased by springs toward normal positions in locked engagement with the pawl. Supply of a fluid under pressure to the cylinders displaces the control pistons in directions retracting the latches to release positions disengaged from the pawl thereby releasing the locking shaft and the releasable structure from the base structure. In the event one of the latches fails to move to the release position, the pawl is free to rotate with respect to the locking shaft for disengagement from the failed latch.

The '229 Smith Patent disclosed a portable cable release mechanism for mounting on the deck of a tow boat, tug, ship or dock and used to tow and dock barges, boats and ships. The mechanism is designed to receive one end of a tow cable or docking cable in order to secure and selectively release the vessels. The cable release mechanism includes a pelican hook pivotally attached to a frame which can be removably mounted on a dock or secured to the deck of a tow boat, ship or barge by means of a clevis plate. A sliding keeper normally secures the pelican hook in closed configuration in the frame and release of a towing or docking cable from the pelican hook is automatically effected by activating an air or hydraulic cylinder having a piston provided in cooperation with the keeper ring. This action extends the cylinder piston and forces the keeper from engagement with the pelican hook, allowing the pelican hook to pivot rearwardly.

The '171 Rudoy Patent disclosed a non-explosive separation nut for releasing a threaded bolt under remote control signals. The separation nut includes a housing, a segmented nut, a locking sleeve, a rocker and two non-explosive actuator (NEA) assemblies. The segmented nut can split radially into three or more segments and has an exterior surface with raised ridges and alternate recessed grooves. The locking sleeve is biased by a spring and placed over the segmented nut. It has an interior surface with retaining pins retaining the segmented nut. The locking sleeve is engaged with the two NEA assemblies through a tiltable rocker. When neither NEA assemblies is actuated, the retaining pins of the locking sleeve are engaged with the ridges of the segmented nut, so that the segments of the segmented nut are compressed radially inwardly for fastening the threaded bolt. When both or either one of the two NEA assembly is actuated, the locking sleeve will move by the biasing spring, such that the retaining pins of the locking sleeve will be engaged with the grooves of the segmented nut, so that the segments of the segmented nut can move radially outwardly for releasing the threaded bolt.

The '147 Rudoy Patent disclosed an electrotechnical high load separation apparatus with a smooth release which can be utilized in various applications such as a structural separation mechanism for a nut/bolt, a cable release mechanism, or a replacement of cable cutters.

The '748 Rudoy Patent disclosed a release mechanism for retaining an object and then releasing that object upon actuation, which utilizes an actuator that resists less force than that exerted by said object, and is adapted for use with a V-band clamp.

The Godfrey Patent which disclosed a release link for interconnecting first and second cables, includes a cylinder having an open first end and an aperture through a second end, a collar fixed to the cylinder first end, and having an annular internal flange, and a guide washer slidably disposed in the collar second end. The link further includes a piston extending through the cylinder aperture and through the guide washer, the piston including a neck portion and a head portion disposed at a first end of the piston. A cap is connectable to the collar. Balls are adapted to be disposed adjacent the piston neck portion and radially adjacent the collar internal flange. A spring is disposed in the cylinder and biases the guide washer toward the balls. A first connector is on the cap for attachment to the first cable, and a second connector is on a second end of the piston for attachment to the second cable. Tension on the cables exceeding the bias of the spring is operative to move the guide washer and the piston, to move the balls from radial adjacency to the collar internal flange, to permit the piston to disengage from the cylinder.

G&H's European Application disclosed an electrotechnical high load separation device for providing a reliable means of separation for high-load, mission-critical applications, e.g., deployment of solar and high-gain antennas on a satellite. The load separation device provides a structural support for a bolted joint that can be remotely separated by transmitting an electrical signal without the use of explosive initiators. When a separation or deployment is desired, a power supply is remotely triggered to transmit an electrical signal to the separation device. This signal will energize both or either one of the two spools, which would cause them to separate. This in turn allows spring-loaded plungers to drive through the spools, resulting in mechanical actuation. The actuation will physically release a threaded rod and its attachment, completing its function.

G&H's Japanese Application disclosed an electrotechnical high load separation device which imparts a structural support to a bolted joint remotely separable by transmitting an electric signal without using an explosive initiator. When requiring separation or unfolding, a power source is remotely triggered for transmitting the electric signal to the separator. This signal energizes both or either one of two spools to separate them. As a result, a plunger with a spring can be driven in order by passing through the spools to be mechanically started. This starting completes the function by physically opening a carved rod and the attachment.

While many of the above cited references have described various separation mechanism systems that utilize non-explosive actuators (NEAs), it is still desirable to design and construct a release mechanism where redundant NEAs are arranged in an integral unit for retaining the adjacent ends of two cables where the actuation of any one of the NEAs will cause the mechanical release of both cables. It is also desirable to design and construct such an NEA-initiated cable release mechanism which can withstand high preload capability applied on the unit for spacecraft applications.

SUMMARY OF THE INVENTION

The present invention is a lightweight, redundant, non-explosive and high-load capability cable release mechanism.

It is an object of the present invention to provide a cable release mechanism for mechanical structural separation applications.

It is also an object of the present invention to provide a non-explosive actuator (NEA) initiated cable release mechanism for mechanical structural separation applications.

It is another object of the present invention to provide a non-explosive actuator (NEA) initiated cable release mechanism for mechanical structural separation applications.

It is an additional object of the present invention to provide a redundant dual-NEAs initiated cable release mechanism for mechanical structural separation applications.

It is a further object of the present invention to provide a redundant dual-NEAs initiated cable release mechanism for high-load capability spacecraft structural separation applications.

Described generally, the present invention is a high-load capability non-explosive cable release mechanism for retaining the adjacent ends of two cables and releasing them upon receiving an electrical current of a sufficient magnitude from a remote source. The cable release mechanism includes a casing having a longitudinal chamber for housing two oppositely disposed non-explosive actuators (NEAs), and a transverse center bore for housing a jaw and ramp assembly for retaining and releasing the adjacent ends of the two cables. Each NEA has two spool halves bound by a wrap wire for resisting an outward movement of a spring biased plunger, a link wire for maintaining tension of the wrap wire, and electrical terminals connected to the link wire and adapted for connection with the external electrical connectors. The jaw and ramp assembly has two longitudinally oppositely arranged jaw members each attached to a proximal end of the plunger of a respective one of the two NEAs, and two transversely oppositely disposed ramp members each holding a respective one of the proximal ends of the two cables. Each jaw member has two inward facing recesses, and each ramp member has two outward facing flanges, such that the engagement of the flanges of the ramp members with the recesses of the jaw members retains the proximal ends of the two cables together within the transverse center bore of the casing. When an electrical current is applied on the link-wire of any one or both of the NEAs, the link-wire will break, causing the wrap-wire to be loosened, which allows the spool halves to separate, which permits the outward movement of the plunger and the jaw member attached thereto, which in turn allows the adjacent ends of the two cables to be released from the casing.

The present invention high-load capability non-explosive cable release mechanism has many unique features and advantages. It uses two NEAs to ensure the redundancy of non-explosive structural separation, where any one or both of the NEAs can be actuated to release the cable. It also utilizes specially designed jaw and ramp members to increase its load capability. In addition, the separation is reliable, safe, debris free and virtually without any imparted shock. Moreover, the cable release mechanism can be refurbished after each use and be used again.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated.

DETAILED DESCRIPTION OF THE PREFERRED EMBODIMENTS

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Figure 1:
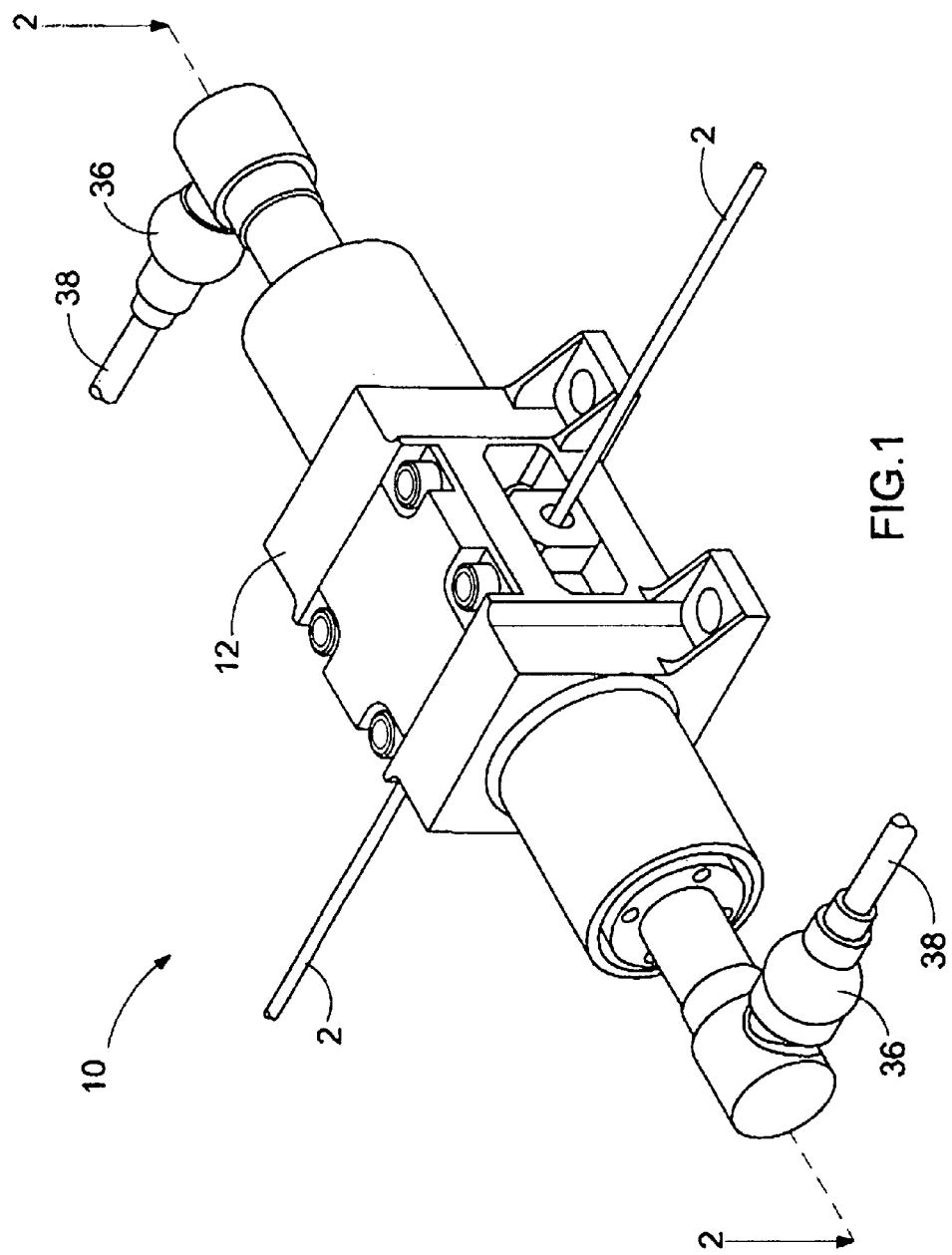
FIG. 1 is a perspective view of one of the preferred embodiments of the present invention high-load capability non-explosive cable release mechanism.
Figure 2:
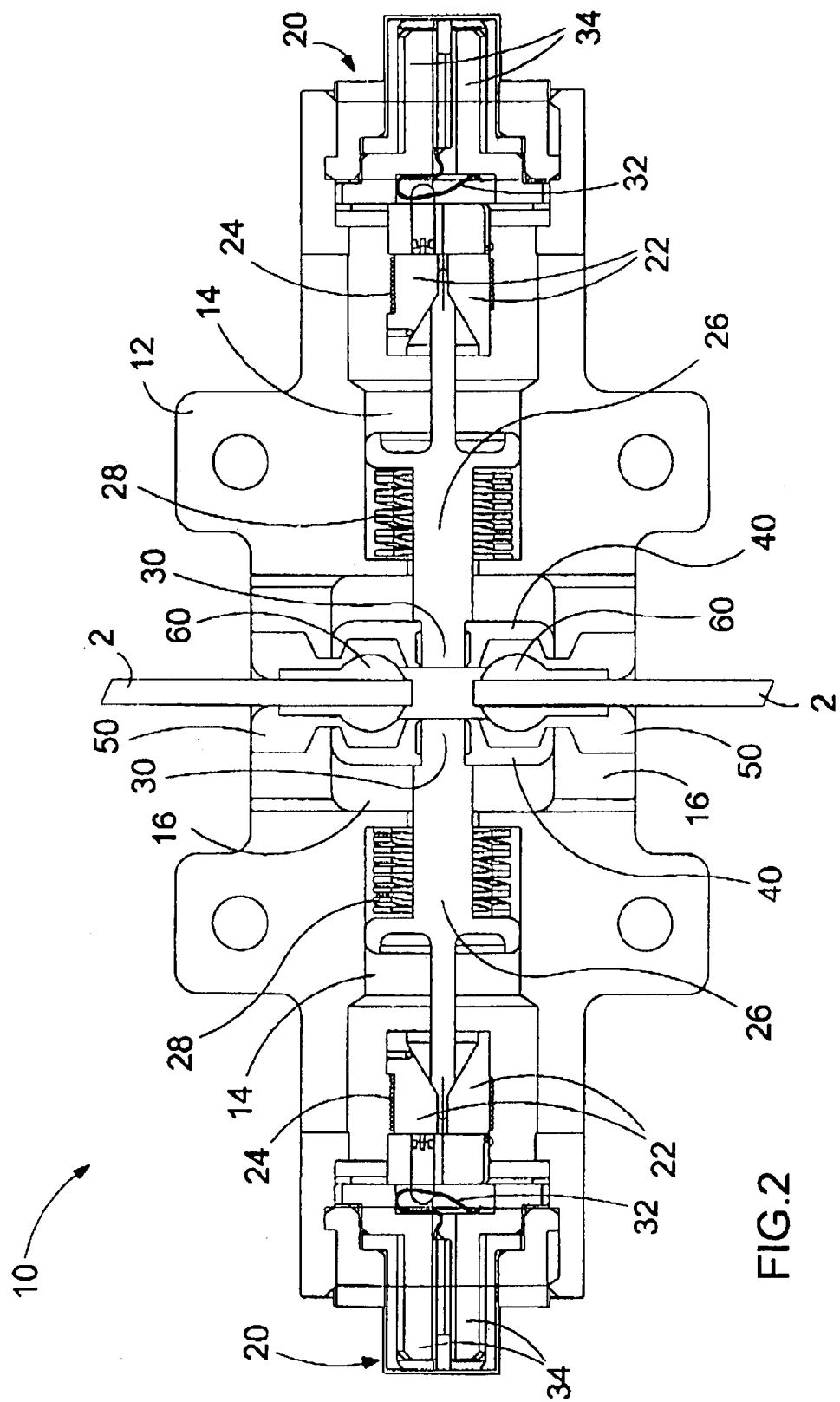
FIG. 2 is a cross-sectional view taken along line 2—2 of FIG. 1.

Referring to FIGS. 1 and 2, there is shown at 10 one of the preferred embodiments of the present invention high-load capability non-explosive cable release mechanism used in mechanical structural separation applications. The purpose of the cable release mechanism 10 is to hold the adjacent ends of two cables 2 together when required, and release them in a non-explosive manner when needed.

The high-load capability non-explosive cable release mechanism 10 has a casing 12 which has a longitudinal chamber 14 for housing its internal components and a transverse center bore 16 for holding the adjacent ends of the two cables 2.

Two non-explosive actuators (NEAs) 20 are arranged in opposite portions of the longitudinal chamber 14. Each NEA 20 has two spool halves 22, a wrap-wire 24 for bounding the two spool halves 22, and a plunger 26. The plunger 26 of each NEA 20 is biased by a coil spring 28 to move outwardly.

Meanwhile, the wrap-wire 24 of each NEA 20 exerts a circumferential stress on the spool halves 22 to bound them together for resisting the outward movement of the plunger 26. However, the tension of the wrap-wire 24 is maintained by a link-wire 32 which is connected to electrical terminals 34 of each NEA 20.

An external electrical connector 36 is connected to each NEA 20 and through its electrical wire 38 connected to a remote electrical current source (not shown). When an electrical current of a sufficient magnitude from the remote electrical current source is applied through the electrical wire 38 and connector 36 to the electrical terminals 34 of the NEA 20, the link-wire 32 will be heated. As a result, its tensile strength will be reduced. When the tensile strength of the link-wire 32 is reduced to a magnitude below the tensile stress exerted on the link-wire 32 by the wrap-wire 24, the link-wire 32 will break, which causes the wrap-wire 24 be loosened, allowing the two spool halves 22 to separate apart which permits the outward movement of the plunger 26.

Figure 4:
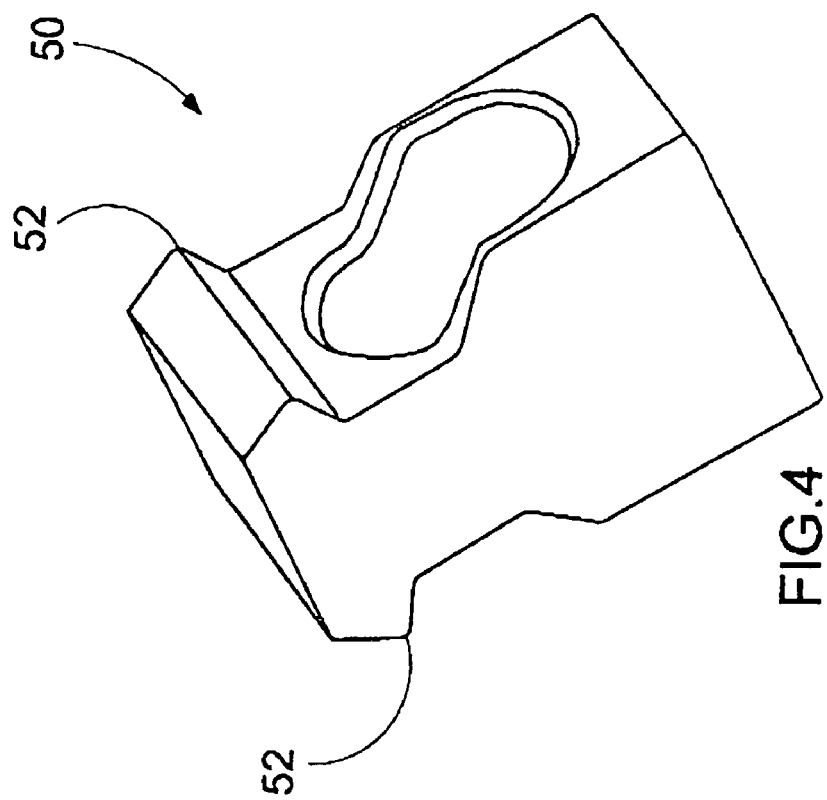
FIG. 4 is a perspective view of one of the preferred embodiments of the ramp member used in the present invention high-load non-explosive capability cable release mechanism.
Figure 3:
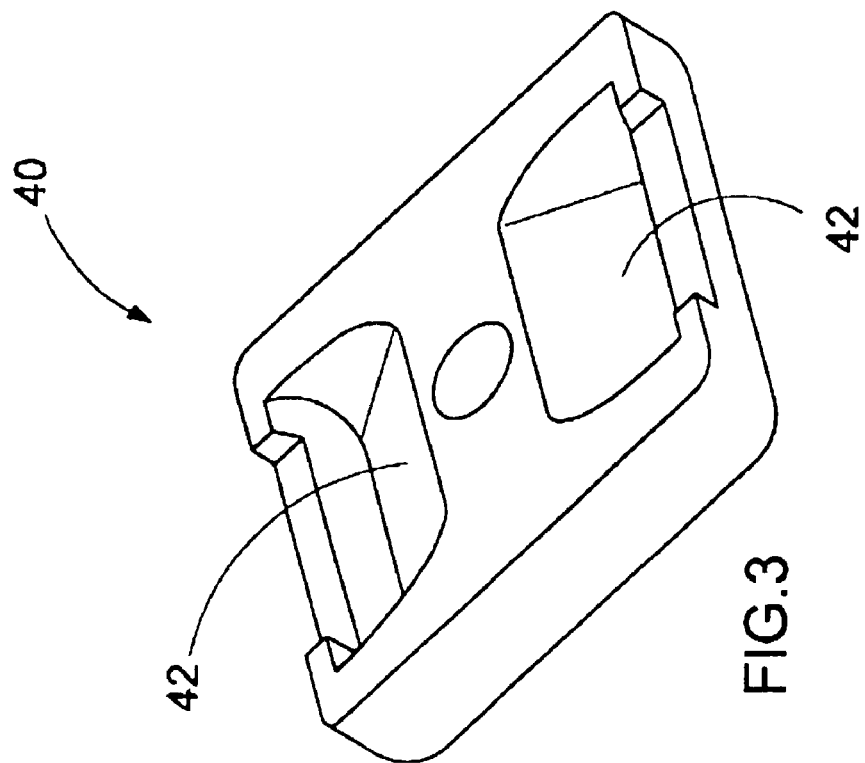
FIG. 3 is a perspective view of one of the preferred embodiments of the jaw member used in the present invention high-load non-explosive capability cable release mechanism.

At the middle of the casing 12 where the longitudinal chamber 14 and the transverse center bore 16 intersect, the adjacent ends of the two cables 2 are held together by a "ramp and jaw" assembly which includes two longitudinally oppositely disposed jaw members 40 and two transversely oppositely disposed ramp members 50. Each jaw member is attached to the proximal end 30 of the plunger 26 of a respective NEA 20. As shown in FIGS. 2 through 4, a "cable ball" 60 is affixed to the end of each cable 2 which has an enlarged diameter as compared to the cables 2. The end of each cable 2 with the enlarged "cable ball" 60 is held in place by the ramp member 50 which has two outwardly facing wedge-shaped proximal flanges 52 that are in turn engaged with and held in place by a respective one of the inward facing recesses 42 of the jaw members 40.

When the cables 2 are to be released, an electrical current of a sufficient magnitude from the remote electrical current source is applied through the electrical wire 38 and connector 36 to the electrical terminals 34 of the NEA 20, causing its link-wire 32 to break which allows the two spool halves 22 to separate apart, which in turn permits the outward movement of the plunger 26, as described in detail above. The outward movement of the plunger 26 will cause the jaw member 40 attached at the proximal end 30 of the plunger 26 to move outwardly as well. This increases the gap between the two jaw members 40, allowing the cables 2 to be released from the casing 12.

The present invention high-load capability non-explosive cable release mechanism has many unique features and important advantages. Most notably, it utilizes two oppositely arranged NEAs to ensure the redundancy of non-explosive operation where any one or both of the NEAs can be actuated to cause the attached cables to be mechanically released in a non-explosive manner. The mechanical structural separation operation is reliable, safe, debris free and virtually without any imparted shock. After each use, the cable release mechanism can be refurbished and used again.

The present invention high-load capability non-explosive cable release mechanism also incorporates specially designed jaw and ramp members to increase the load capability of the cables it can handle. For example, in certain spacecraft applications, a load of one hundred pounds on the cable is considered a high load. However, with the incorporation of the specially designed jaw and ramp assembly, the load capability of the present invention cable release mechanism is increased by more than ten fold.

Defined in detail, the present invention is a cable release mechanism for retaining the adjacent ends of two cables each having a proximal end and a distal end and releasing the two cables upon receiving an electrical current of a sufficient magnitude from a remote source through external electrical connectors, comprising: (a) a casing having a longitudinal chamber for housing two oppositely disposed non-explosive actuators (NEAs), and a transverse center bore for housing a jaw and ramp assembly for retaining and releasing the adjacent ends of the two cables; (b) each NEA having two spool halves bound by a wrap wire for resisting an outward movement of a spring biased plunger, a link wire for maintaining tension of the wrap wire, and electrical terminals connected to the link wire and adapted for connection with the external electrical connectors; (c) the jaw and ramp assembly having two longitudinally oppositely arranged jaw members each attached to a proximal end of the plunger of a respective one of the two NEAs, and two transversely oppositely disposed ramp members each holding a respective one of the proximal ends of the two cables; and (d) each jaw member having two inward facing recesses, and each ramp member having two outward facing flanges, such that the engagement of the flanges of the ramp members with the recesses of the jaw members retains the proximal ends of the two cables together within the transverse center bore of the casing; (e) whereby when the electrical current is applied on the link-wire of any one or both of the NEAs, the link-wire will break, causing the wrap-wire to be loosened, which allows the spool halves to separate, which permits the outward movement of the plunger and the jaw member attached thereto, which in turn allows the adjacent ends of the two cables to be released from the casing.

Defined broadly, the present invention is a cable release mechanism for retaining the adjacent ends of two cables each having a proximal end and a distal end and releasing the two cables upon receiving an electrical signal from a remote source through external electrical connectors, comprising: (a) a casing having a chamber for housing two non-explosive actuators (NEAs), and a center bore which intersects the chamber for housing a jaw and ramp assembly for retaining and releasing the adjacent ends of the two cables; (b) each NEA having an outwardly movable plunger, an internal assembly that permits the plunger to move outwardly upon receiving of the electrical signal; (c) the jaw and ramp assembly having two oppositely arranged jaw members each attached to a proximal end of the plunger of a respective one of the two NEAs, and two transversely disposed ramp members each holding a respective one of the proximal ends of the two cables; and (d) the jaw members engaging and holding the ramp members in place to retain the proximal ends of the two cable together within the center bore of the casing; (e) whereby upon receiving of the electrical signal by any one or both of the NEAs, the plunger of such one or both NEAs will move outwardly with the jaw member attached thereto, which allows the adjacent ends of the two cables to be released from the casing.

Defined more broadly, the present invention is a cable release mechanism for retaining the adjacent ends of two cables each having a proximal end and a distal end and releasing the two cables upon receiving a signal from a remote source, comprising: (a) a casing having a chamber for housing two non-explosive actuators (NEAs) and having a center bore for housing a jaw and ramp assembly; (b) each NEA connected to the jaw and ramp assembly for independently operating the jaw and ramp assembly to retain or release the proximal ends of the two cables; and (c) each said NEA has a plunger biased by a spring which urges the plunger to move outwardly; (d) whereby upon receiving the signal by any one or both of the NEAs, the jaw and ramp assembly will release the adjacent ends of the two cables from the casing.

Of course the present invention is not intended to be restricted to any particular form or arrangement, or any specific embodiment, or any specific use, disclosed herein, since the same may be modified in various particulars or relations without departing from the spirit or scope of the claimed invention hereinabove shown and described of which the apparatus shown is intended only for illustration and disclosure of an operative embodiment and not to show all of the various forms or modifications in which this invention might be embodied or operated.

The present invention has been described in considerable detail in order to comply with the patent laws by providing full public disclosure of at least one of its forms. However, such detailed description is not intended in any way to limit the broad features or principles of the present invention, or the scope of the patent to be granted. Therefore, the invention is to be limited only by the scope of the appended claims.

What is claimed is:

1. A cable release mechanism for retaining the adjacent ends of two cables each having a proximal end and a distal end, and releasing the two cables upon receiving an electrical current of a sufficient magnitude from a remote source through external electrical connectors, comprising:

a. a casing having a longitudinal chamber for housing two oppositely disposed non-explosive actuators (NEAs), and a transverse center bore for housing a jaw and ramp assembly for retaining and releasing said adjacent ends of said two cables;

b. each said NEA having two spool halves bound by a wrap wire for resisting an outward movement of a spring biased plunger, a link wire for maintaining tension of said wrap wire, and electrical terminals connected to the link wire and adapted for connection with said external electrical connectors;

c. said jaw and ramp assembly having two longitudinally oppositely arranged jaw members each attached to a proximal end of said plunger of a respective one of said two NEAs, and two transversely oppositely disposed ramp members each holding a respective one of said proximal ends of said two cables; and d. each said jaw member having two inward facing recesses, and each said ramp member having two outward facing flanges, such that the engagement of said flanges of said ramp members with said recesses of said jaw members retains said proximal ends of said two cables together within said transverse center bore of said casing;

e. whereby when said electrical current is applied on said link-wire of any one or both of said NEAs, said link-wire will break, causing said wrap-wire to be loosened, which allows said spool halves to separate, which permits said outward movement of said plunger and said jaw member attached thereto, which in turn allows said adjacent ends of said two cables to be released from said casing.

2. The cable release mechanism in accordance with claim 1, wherein said outward facing flanges of each said ramp member are wedge-shaped.

3. A cable release mechanism for retaining the adjacent ends of two cables each having a proximal end and a distal end, and releasing the two cables upon receiving an electrical signal from a remote source through external electrical connectors, comprising:

a. a casing having a chamber for housing two non-explosive actuators (NEAs), and a center bore which intersects the chamber for housing a jaw and ramp assembly for retaining and releasing said adjacent ends of said two cables;

b. each said NEA having an outwardly movable plunger, an internal assembly that permits said plunger to move outwardly upon receiving of said electrical signal;

c. said jaw and ramp assembly having two oppositely arranged jaw members each attached to a proximal end of said plunger of a respective one of said two NEAs, and two transversely disposed ramp members each holding a respective one of said proximal ends of said two cables; and d. said jaw members engaging and holding said ramp members in place to retain said proximal ends of said two cables together within said center bore of said casing;

e. whereby upon receiving of said electrical signal by any one or both of said NEAs, said plunger of such one or both NEAs will move outwardly with said jaw member attached thereto, which allows said adjacent ends of said two cables to be released from said casing.

4. The cable release mechanism in accordance with claim 3, wherein said two NEAs are oppositely disposed in said chamber of said casing.

5. The cable release mechanism in accordance with claim 3, wherein said plunger of each said NEA is biased by a spring which urges said plunger to move outwardly.

6. The cable release mechanism in accordance with claim 3, wherein each said NEA has two spool halves bound by a wrap wire for resisting an outward movement of said plunger.

7. The cable release mechanism in accordance with claim 6, wherein each said NEA has a link wire for maintaining tension of said wrap wire to bind said two spool halves together.

8. The cable release mechanism in accordance with claim 7, wherein each said NEA has electrical terminals connected to said link wire and adapted for connection with said external electrical connectors.

9. The cable release mechanism in accordance with claim 3, wherein each said jaw member has two inward facing recesses, and each said ramp member having two outward facing flanges for engagement with said recesses of said jaw members.

10. The cable release mechanism in accordance with claim 9, wherein said outward facing flanges of each said ramp member are wedge-shaped.

11. A cable release mechanism for retaining the adjacent ends of two cables each having a proximal end and a distal end, and releasing the two cables upon receiving a signal from a remote source, comprising:

a. a casing having a chamber for housing two non-explosive actuators (NEAs) and having a center bore for housing a jaw and ramp assembly;

b. each said NEA connected to said jaw and ramp assembly for independently operating said jaw and ramp assembly to retain or release said proximal ends of said two cables; and c. each said NEA has a plunger biased by a spring which urges the plunger to move outwardly;

d. whereby upon receiving said signal by any one or both of said NEAs, said jaw and ramp assembly will release said adjacent ends of said two cables from said casing.

12. The cable release mechanism in accordance with claim 11, wherein said two NEAs are oppositely disposed in said chamber of said casing.

13. The cable release mechanism in accordance with claim 11, wherein each said NEA has two spool halves bound by a wrap wire for resisting an outward movement of said plunger.

14. The cable release mechanism in accordance with claim 13, wherein each said NEA has a link wire for maintaining tension of said wrap wire.

15. The cable release mechanism in accordance with claim 14, wherein each said NEA has electrical terminals connected to said link wire and adapted for connection to said remote source.

16. The cable release mechanism in accordance with claim 11, wherein said jaw and ramp assembly has two oppositely arranged jaw members each attached to a proximal end of an outwardly movable plunger of a respective one of said two NEAs.

17. The cable release mechanism in accordance with claim 16, wherein said jaw and ramp assembly has two transversely disposed ramp members each holding a respective one of said proximal ends of said two cables.

18. The cable release mechanism in accordance with claim 17, wherein each said jaw member having two inward facing recesses, and each said ramp member having two outward facing flanges for engagement with said recesses of said jaw members.

19. The cable release mechanism in accordance with claim 18, wherein said outward facing flanges of each said ramp member are wedge-shaped.

* * * * *